US011632241B2

(12) United States Patent
Hutchinson (10) Patent No.: US 11,632,241 B2
(45) Date of Patent: Apr. 18, 2023

(54) SYSTEM AND METHOD FOR REGISTERING A USER (71) Applicant: SuperAwesome Trading Limited, London (GB)

(72) Inventor: Michael Benjamin Hutchinson, London (GB)

(73) Assignee: Epic Games, Inc., Cary, NC (US)

(*) Notice: Subject to any disclaimer, the term of this patent is extended or adjusted under 35 U.S.C. 154(b) by 3 days.

(21) Appl. No.: 17/324,441

(22) Filed: May 19, 2021

(65) Prior Publication Data
US 2021/0367765 A1 Nov. 25, 2021

(30) Foreign Application Priority Data
May 19, 2020 (EP) .................................. 20175520

(51) Int. Cl.
H04L 29/06 (2006.01)
H04L 9/08 (2006.01)
H04L 9/32 (2006.01)

(52) U.S. Cl.
CPC ............ H04L 9/083 (2013.01); H04L 9/0866 (2013.01); H04L 9/321 (2013.01)

(58) Field of Classification Search
CPC ....... H04L 9/083; H04L 9/0866; H04L 9/321; G06F 21/6245; G06F 21/31; G06F 21/6218; G06F 2221/2149; G06F 2221/2117
See application file for complete search history.

(56) References Cited

U.S. PATENT DOCUMENTS

2007/0266079 A1* 11/2007 Griddle ................ G06Q 10/107
709/203
2011/0072039 A1* 3/2011 Tayloe .................... G06F 21/62
707/769
2011/0099616 A1* 4/2011 Mazur .................... G06F 21/31
726/7

(Continued)

OTHER PUBLICATIONS

European Patent Office, Communication Including the Extended European Search Report, European Patent Application No. 20175520.4, dated Oct. 30, 2020, pp. 1-9.

Primary Examiner — Yogesh Paliwal
(74) Attorney, Agent, or Firm — Hunton Andrews Kurth LLP (57) ABSTRACT According to an aspect of the present disclosure, a method performed by a verification platform for authorising a user incapable of providing digital consent comprises: receiving sensitive user information and a unique supervisor identifier; encrypting the sensitive user information using an encryption scheme with an associated encryption key to generate encrypted user information; sending an authorisation request message to a supervisor device associated with the unique supervisor identifier, wherein the authorisation request message comprises the encryption key and a request for authorisation in response; discarding the sensitive user information and the encryption key, such that the verification platform cannot access the sensitive user information; and, if the verification platform receives an authorisation response message from the supervisor device comprising a received encryption key, decrypting the encrypted user information using the received encryption key, such that the verification platform can successfully access the sensitive user information.

19 Claims, 5 Drawing Sheets (56) References Cited

U.S. PATENT DOCUMENTS

| | | | |
|---|---|---|---|
| 2012/0011594 A1* | 1/2012 | Nguyen | G06F 21/6218 |
| | | | 726/28 |
| 2012/0171990 A1 | 7/2012 | Williams et al. | |
| 2013/0254288 A1* | 9/2013 | Harrison | G06Q 20/425 |
| | | | 709/204 |
| 2014/0150068 A1* | 5/2014 | Janzer | H04L 63/10 |
| | | | 726/4 |
| 2016/0014043 A1* | 1/2016 | Kong | H04L 47/801 |
| | | | 709/203 |
| 2017/0177891 A1* | 6/2017 | Hampson | G06F 21/6218 |
| 2020/0222813 A1* | 7/2020 | Baszucki | A63F 13/792 |

* cited by examiner

SYSTEM AND METHOD FOR REGISTERING A USER

CROSS REFERENCE TO RELATED APPLICATIONS

This application claims priority to European Patent Application No. 20175520.4, filed May 19, 2020, the disclosure of which is hereby incorporated by reference in its entirety.

BACKGROUND

Many service providers use online, or web, registration methods to allow users to create profiles and accounts linked to their online services, for example websites, apps, games. These may be implemented for a large variety of reasons such as enabling customers to shop at an online storefront, accessing of protected pages or information on a website, or to provide the user with a persistent account that saves a history of their use of the online service. The collection and processing of user data enables an online service provider to track and record information related to the activities of the user.

Registration methods typically require the prospective user to submit a unique identifier, such as an email address, and a password that are subsequently stored by the website operator or a third party acting on behalf of the website operator.

However, in an increasing number of jurisdictions it is unlawful to collect or use the personal data of a child without the consent of the child's parent or legal guardian to do so (referred to as 'legal guardian' herein). Recent legislation such as the European Union's General Data Protection Regulation (GDPR), and the United States' Children's Online Privacy Protection Act (15 U.S.C. Ch. 91, herein referred to as COPPA) have recognised that children's personal data should be granted special protection because they may be less aware of any risks and consequences of sharing their data. Similar legislation is being enacted worldwide. COPPA defines a child as an individual under thirteen years old, while the GDPR sets the age of digital consent as sixteen years old (though individual member states can choose to lower this to a minimum of thirteen years old). Some examples of personal data which this legislation may apply to include a name of the child, screen or user name that functions as online contact information, a persistent identifier that can be used to recognise a user over time and across different websites or online services, or a file which contains a child's image. Collectively this type of personal data may be referred to as personally identifiable information (PII). The legislation applies even if the personal data merely forms part of user-generated content, for example if a child creates an image using an online tool and the image includes their signature—that is, the data can identify the child.

These special protections introduce new requirements for the operators of websites and online services who know they are collecting personal data from children. One of these requirements is that consent for the processing of the personal data of the child must be given or authorised by the holder of parental responsibility over the child.

In addition, collecting, storing and processing personal data inherently brings about fraud risks. The greater the number of people who have access to the data, and the easier it is to access, then the greater the risk of fraud occurring.

Many current registration methods for online services include an age-gate to determine whether parental consent is required for the prospective user to use the online service. However, these methods are not capable of determining whether the necessary consent has been granted by the appropriate responsible person (e.g. the child's legal guardian) and so cannot allow the user to complete registration and use the online service, if consent is required.

If the online service provider decides to request consent from the legal guardian, they must seek authorisation for the storage and processing of child personal data while maintaining compliance with the relevant data protection laws (i.e. without storing the child personal data themselves, even temporarily).

The child-legal guardian relationship is an example of a user-supervisor relationship where this dichotomy exists, i.e. how to seek authorisation to store data without first storing the data. There currently exists no technical solution to address this problem.

Accordingly, there is a need for a method or system capable of seeking and verifying authorisation for the processing of personal data without storing that same personal data.

SUMMARY

According to a first aspect of the present disclosure, there is provided a method performed by a verification platform for authorising a user incapable of providing digital consent, the method comprising: receiving sensitive user information and a unique supervisor identifier; encrypting the sensitive user information using an encryption scheme with an associated encryption key to generate encrypted user information; sending an authorisation request message to a supervisor device associated with the unique supervisor identifier, wherein the authorisation request message comprises the encryption key and a request for authorisation in response; discarding the sensitive user information and the encryption key, such that the verification platform cannot access the sensitive user information; and, if the verification platform receives an authorisation response message from the supervisor device comprising a received encryption key, decrypting the encrypted user information using the received encryption key, such that the verification platform can successfully access the sensitive user information.

As the verification method requires the discarding of the sensitive user information and the encryption key, the verification platform is not able to access the sensitive user information, either by accessing it directly or indirectly by decrypting the encrypted user information. While the platform stores the encrypted data, it has no means to decrypt it. Thus the personally identifiable information of a user incapable of giving consent is not accessible until a message granting authorisation is received. Advantageously, such an approach maintains compliance with the relevant data protection regulations while allowing, and ensuring security of, data storage.

As the authorisation request message, comprising the encryption key, is sent to the supervisor, the platform presents the supervisor with the ability to grant or refuse authorisation and manage the encryption key accordingly. It should be noted that, at all times, the ability to access or read sensitive data is given only to those persons with the ability to grant consent or those who have positively received it, thus providing essential control to the supervisor. It is only once the consent-giver has delegated authority to the verification platform that the sensitive data be subsequently accessed.

Once the authorisation response message has been received, the verification platform may use the encryption key to decrypt the encrypted user identifier and access the sensitive user information. When the sensitive user information can be accessed, it can be used by the verification platform (or transmitted to an approved destination for use) according to the needs of the online service.

To summarise, the verification method enables personally identifiable information (PII) to be converted into non-PII, while authorisation for subsequent processing of the PII is sought, and only converted back into PII once authorisation has been granted.

Receiving the authorisation message comprising the received encryption key provides authorisation from the supervisor (either explicitly or implicitly) for processing of the unique user identifier. The exact nature and limits of the authorisation provided may be defined in the authorisation response message, for example, the authorisation request message may comprise a set of permissions parameters and/or a written statement of consent. The permissions parameters may be approved individually or as a whole. Examples of permission parameters for which authorisation is sought may include the processing of the sensitive user information in a registration process, permission for the subsequent transmission of the sensitive user information, permission for the modification of the sensitive user information, permission for direct correspondence with the user, permission for ancillary services such as charging, etc.

In an example, the user incapable of providing digital consent may be a child, in a country where COPPA, GDPR or similar legislation applies, while a supervisor (associated with the unique supervisor identifier and the supervisor device) may be the holder of parental responsibility over the child. The verification platform may receive sensitive user information and a unique supervisor from a registration platform, directly from a prospective user or from an alternative source. The sensitive user information may be for example personally identifiable information of the user who is incapable of providing digital consent, which requires authorisation from the supervisor in order for it to be processed. This may be, for example, an email address associated with the user, the name of the user, or a pseudonym of the user.

The unique supervisor identifier may be, for example, an email address associated with the supervisor of the user, a telephone number (e.g. MSISDN) associated with the supervisor of the user, or a website or online service credential associated with the supervisor of the user.

Storing the encrypted user information with no means of decrypting it (i.e. without the encryption key) denies the verification platform any capability of accessing any information protected by the data protection regulations. This means that the service provider and/or verification platform operator is complying with the regulations while being able to process the sensitive user information later (if authorisation is granted by the supervisor). Furthermore, storing sensitive user information in an encrypted format increases the security of the data and lowers the risk of fraud, especially so when the encryption key is discarded.

As the verification platform discards the encryption key and the sensitive user information, sending the authorisation request message, which comprises the encryption key or suitable means of retrieving the encryption key, to a supervisor device provides the operator of the supervisor device (the supervisor) with the sole means of decrypting the encrypted user information, and therefore also deciding whether later processing of the sensitive user information is allowed. The authorisation request message may be, for example, an email, SMS, API request, or any other means capable of retrieving the encryption key. The authorisation request message may comprise a token representing the encryption information. Such tokenisation substitutes the sensitive data element with a non-sensitive equivalent.

The verification method employs an encryption scheme with an associated encryption key to protect the sensitive user information, as these are better suited to securing and retrieving information rather than alternative cryptographic methods. For example, a one-way cryptographic hash function may hash the sensitive user information so it is practically unfeasible to invert. However, this would not allow the verification platform to retrieve the sensitive user information, after authorisation had been granted, without already knowing the hashing function. In which case, the hash function method would have been breaching confidentiality requirements before that point.

This method may be incorporated into an existing registration process of a service provider so that the service provider can ensure they are complying with the regulations without adjusting any of the front-end aspects of their existing registration process.

Preferably, after discarding the sensitive user information and the encryption key, the method may further comprise: if the verification platform receives a refusal response message from the supervisor device, discarding the encrypted user information. The refusal response message from the supervisor device informs the verification platform that the supervisor does not grant authorisation for processing of the sensitive user information. Although continuing to store the encrypted user information, without means of decrypting it, complies with the confidentiality requirements and the relevant regulations, the encrypted user identifier may be discarded for data minimisation purposes. Discarding unnecessary data reduces data storage as well as the risk of fraud occurring. The supervisor and/or the user may also prefer that the encrypted user information is not stored and cannot be accessed.

Additionally or alternatively, after discarding the sensitive user information and the encryption key, the method may further comprise: if a predetermined period of time expires without the verification device receiving a response message from the supervisor device, discarding the encrypted user information. The response message may be an authentication response message or a refusal response message. If a predetermined period of time expires without the verification platform receiving an authorisation response message or a refusal response message, it is assumed that an authorisation response message will not be received and so the encrypted user information may be discarded for data minimisation. The predetermined period of time, or timeout interval, may be, for example, one day, two days, one week, or one month.

Furthermore, as the encryption key and sensitive user information are discarded there is no way for the verification platform to identify duplicate requests related to permissions for the same item of sensitive user information. Therefore, if repeated requests are sent, data storage could escalate beyond that which is required. Discarding the encrypted user information prevents this situation arising.

The received encryption key may be thought of as any key suitable for decrypting the sensitive user information depending on the applied encryption scheme, this may also be called a decryption key and the terms used interchangeably. In certain embodiments, the method may further comprise, before encrypting the unique user identifier: pseudo-randomly generating an encryption key. Randomly generating the encryption key provides that that the encryption key cannot feasibly be regenerated and thereby ensures the encrypted user information is not retrievable or replicable.

Preferably, the encryption key is unique. Using a unique encryption key increases security. Though pseudo-randomly generating the encryption key does not guarantee that the encryption key will be unique, as no record of the encryption key is kept by the verification platform, the verification platform will be unable to tell whether the key is a duplicate and so it can be assumed the encryption key is unique.

Preferably, after the encrypting, the method may further comprise: creating an authorisation request record, in a verification database, comprising the unique supervisor identifier and the encrypted user information; storing the authorisation request record in the verification database; and, if the verification platform receives an authorisation response message, retrieving the authorisation request record from the verification database. Similarly, the method may further comprise, if the verification platform receives a refusal response message, or a predetermined period of time expires without receiving an authentication response message or a refusal response message, retrieving the authorisation request record from the verification database.

Creating and storing an authorisation request record, comprising the unique supervisor identifier and the encrypted user information, in a database provides an association between the unique supervisor identifier and the encrypted user information that the verification platform can access if necessary. For example, after receiving an authorisation response message from the supervisor device, the verification platform can locate and retrieve the authorisation request record from the database in order to decrypt the encrypted user information. Alternatively, after receiving a refusal response message, or after waiting a predetermined period of time, the verification platform can delete or amend the authorisation request record from the database in order to discard the encrypted user information and/or the unique supervisor identifier for data minimisation.

In preferred embodiments, the method may further comprise, before sending the authorisation request message: encoding the encryption key into the authorisation request message. In this way the message itself comprises the encryption key. In alternative embodiments, the message may comprise a pointer to a secure location from which the encryption key can be retrieved.

The authorisation request message may further comprise an authenticated URL suitable for granting permission to decrypt the sensitive user information and sending the authorisation response message from the supervisor device to the verification platform. The authenticated URL provides passwordless authentication, enabling the supervisor to provide authorisation and return the encryption key with low user friction. The authenticated URL may otherwise be referred to as a magic link. The authenticated URL preferably comprises a token representing the encryption key and/or the sensitive user information. Tokenisation in this way provides a secure means to transfer the necessary information and a user-friendly way to transmit the key needed for decryption back to the verification platform.

According to a second aspect of the present invention, there is provided a verification platform configured to perform any of the above aspects of the user verification method.

According to a third aspect of the present invention, there is provided a verification platform configured to perform a method for authorising a user incapable of providing digital consent, the verification platform being further configured to: receive sensitive user information and a unique supervisor identifier; encrypt the sensitive user information using an encryption scheme with an associated encryption key to generate encrypted user information; send an authorisation request message to a supervisor device associated with the unique supervisor identifier, wherein the authorisation request message comprises the encryption key and a request for authorisation in response; discard the sensitive user information and the encryption key, such that the verification platform cannot access the sensitive user information; and, if the verification platform receives an authorisation response message from the supervisor device comprising a received encryption key, decrypt the encrypted user information using the received encryption key, such that the verification platform can successfully access the sensitive user information.

The verification platform may be further configured to, after discarding the sensitive user information and the encryption key, if the verification platform receives a refusal response message from the supervisor device, discard the encrypted user information.

The verification platform may be further configured to, after discarding the sensitive user information and the encryption key, if a predetermined period of time expires without the verification device receiving a response message from the supervisor device, discard the encrypted user information.

The verification platform may be further configured to, before encrypting the sensitive user information the, pseudo-randomly generate an encryption key.

The verification platform may be further configured to, after the encrypting, create an authorisation request record, in a verification database, comprising the unique supervisor identifier and the encrypted user information; store the authorisation request record in the verification database; and, if the verification platform receives an authorisation response message, retrieve the authorisation request record from the verification database.

The verification platform may be further configured to, wherein before sending the authorisation request message, encode the encryption key into the authorisation request message. The authorisation request message may further comprise an authenticated URL for granting permission to decrypt the sensitive user information and sending the authorisation response message from the supervisor device to the verification platform. The authenticated URL may comprise a token representing the encryption key and/or the sensitive user information.

According to a fourth aspect of the present disclosure, there is provided a user registration method performed by a registration platform for registering a user incapable of providing digital consent, the method comprising: receiving sensitive user information and user consent information; identifying, using the user consent information, whether a user is capable of providing digital consent; and, if the user is not capable of providing digital consent, the method further comprises: receiving a unique supervisor identifier; sending the sensitive user information and the unique supervisor identifier to a verification platform; and subsequently discarding the sensitive user information. The verification platform may be the verification platform of any of the above aspects of the invention. For example, the verification platform may be configured to carry out the first aspect of the invention as set out above.

The registration platform may receive the sensitive user information and user consent information directly from a user, or from another party or service provider to which the user has provided the sensitive user information and user consent information, for example an age-gate provider. Using the user consent information, the registration platform determines whether the user is capable of providing digital consent. For example, the user may be a child, in a country where COPPA, GDPR, or similar legislation applies and so is not capable of providing digital consent. If this is the case, the registration platform discards the sensitive user information, after sending it to a verification platform along with the unique supervisor identifier, and so does not have access to any information protected by the data protection regulations. Therefore, the service provider and/or registration platform operator is complying with the regulations while being able to process the sensitive user information later (if authorisation is granted by the supervisor).

Preferably, the method may further comprise, after discarding the sensitive user information: receiving the sensitive user information from the verification platform following successful authorisation at the verification platform, such that the user registration method can store and access the sensitive user information. The registration platform may receive sensitive user information from the verification platform if the supervisor of the user has provided authorisation, through a part of a user verification method, for the sensitive user information to be processed. The registration platform can therefore use the received sensitive user information in processes for which authorisation has been granted, such as completing a user registration method for an online service, without breaching confidentiality.

The method may further comprise: creating a registration request record, in a registration database, comprising the unique supervisor identifier; and storing the registration request record in the registration database. By creating and storing a registration request record, comprising the unique supervisor identifier, in a database, it is possible to store a registration state associated with the unique supervisor identifier. This may allow, for example, the registration platform to prevent the supervisor receiving duplicate authentication request messages while an earlier authentication request message is still pending and has not been addressed by the supervisor. Thus the method may further comprise, after receiving the unique supervisor identifier, checking the identifier against the database and, if the unique supervisor identifier exists in the database, not sending the sensitive user information and the unique supervisor identifier to a verification platform.

According to a fifth aspect of the present invention, there is provided a registration platform configured to perform any of the above aspects of the user registration method.

According to a sixth aspect of the present invention, there is provided a registration platform configured to perform a user registration method for a user incapable of providing digital consent, the registration platform being further configured to: receive sensitive user information and user consent information; identify using the user consent information, whether a user is capable of providing digital consent; and, if the user is not capable of providing digital consent, the method further comprises: receive a unique supervisor identifier; send the sensitive user information and the unique supervisor identifier to a verification platform; and subsequently discard the sensitive user information.

The registration platform may be further configured to, after discarding the sensitive user information: receive the sensitive user information from the verification platform following successful authorisation at the verification platform, such that the user registration method can store and access the sensitive user information.

The registration platform may be further configured to: create a registration request record, in a registration database, comprising the unique supervisor identifier; and store the registration request record in the registration database.

According to a seventh aspect of the present invention, there is provided a system for performing a user registration and verification method, the system comprising: the registration platform described above; and the verification platform described above.

The verification platform and registration platform may be separate and discrete entities. For example, the verification platform and registration platform may be operated separately; the registration platform by a service provider and the verification platform may be operated by a verification provider. Alternatively, the verification platform and registration platform may be comprised or integrated in the same system. For example, the verification platform and registration platform may be combined into a system that is operated by a single operator. In a second example, the registration platform and/or method may be embedded in an application of an online service provider, while the verification platform and/or method may be operated by a different online service provider.

According to a further aspect of the present invention, there is provided a computer readable medium comprising instructions which, when executed by a processor, cause the processor to: perform the method of the first aspect described above and/or perform the user registration method of the fourth aspect described above.

BRIEF DESCRIPTION OF DRAWINGS

An example of the present invention will now be described in detail with reference to the accompanying drawings, in which.

DETAILED DESCRIPTION

Registration and verification methods, apparatus and systems will now be described in relation to several figures and process flows. This is to set out the required and optional steps as well as to provide context for the implementation of the methods using example scenarios.

Figure 1:
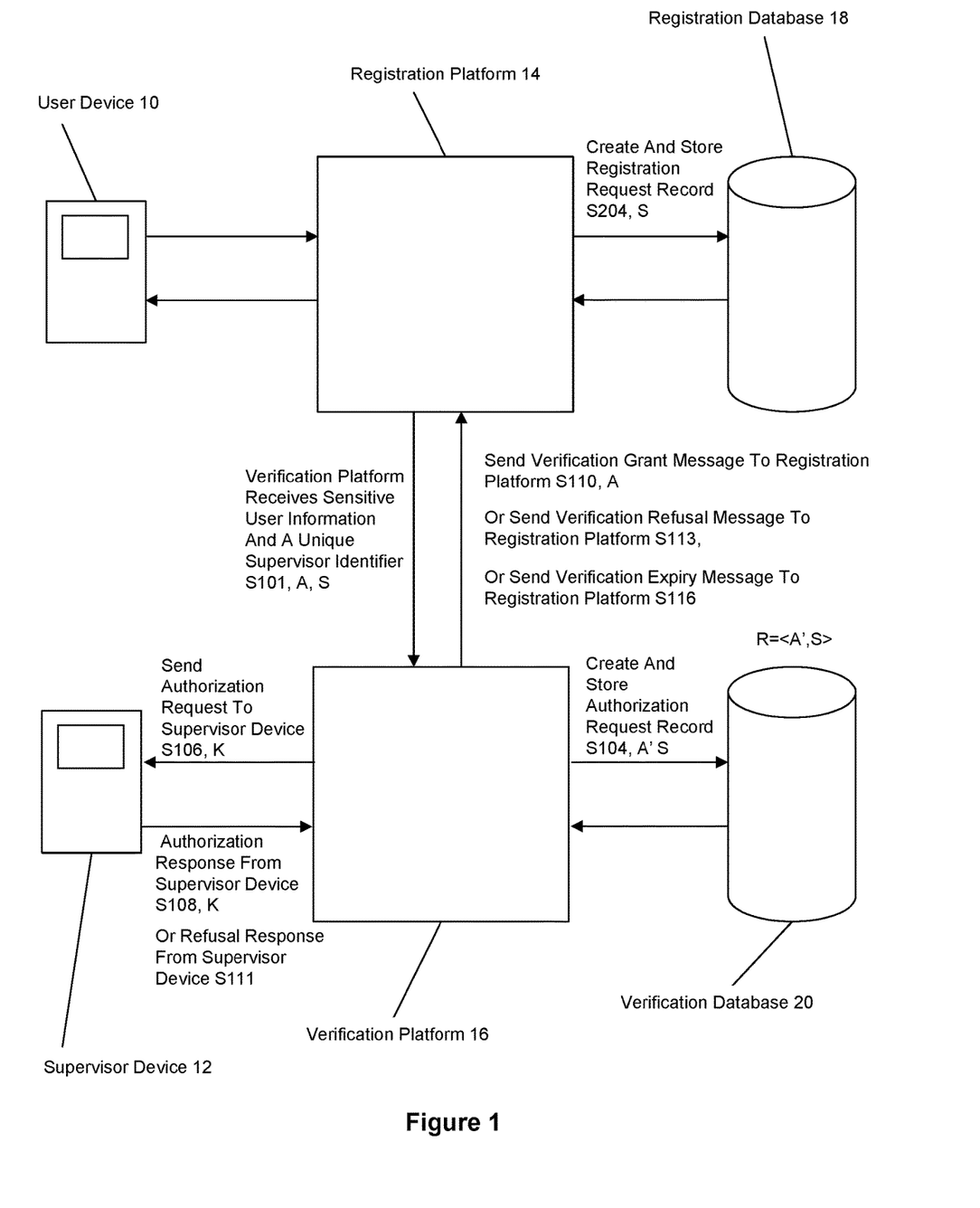
FIG. 1 shows, schematically, a system comprising a verification platform and a registration platform.
Figure 2:
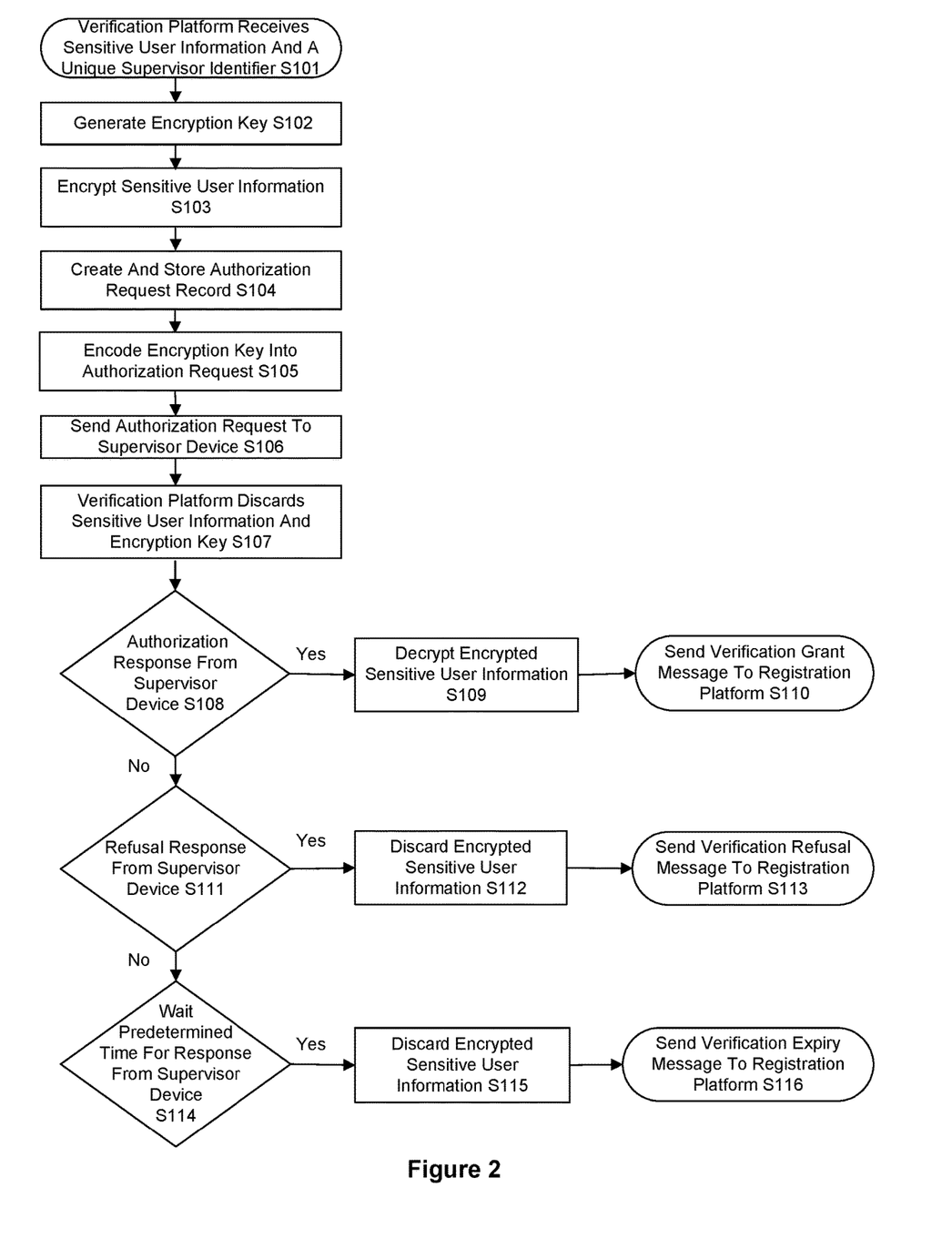
FIG. 2 shows a process flow of a verification method performed by a verification platform.
Figure 3:
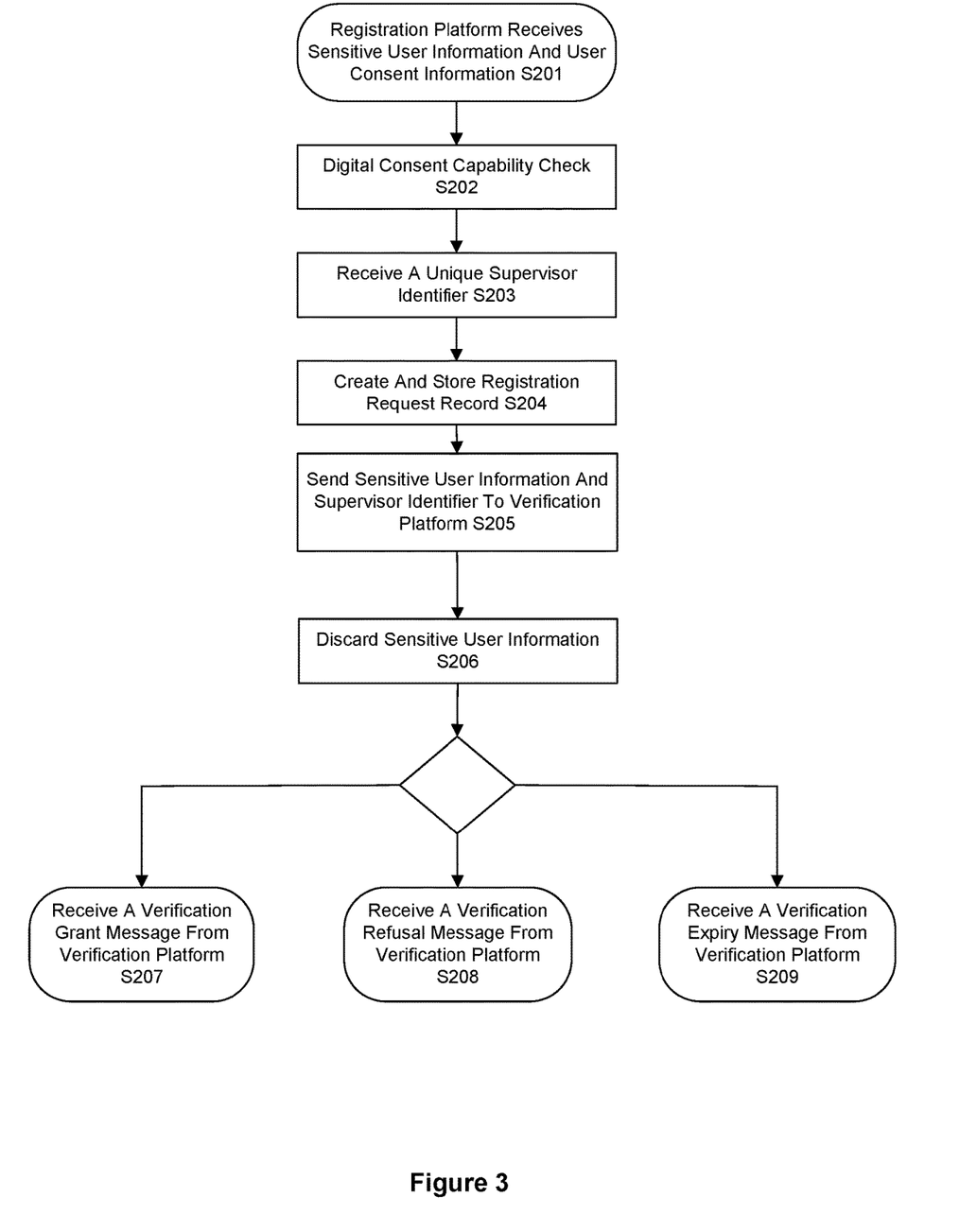
FIG. 3 shows a process flow of a registration method performed by a registration platform.
Figure 4A:
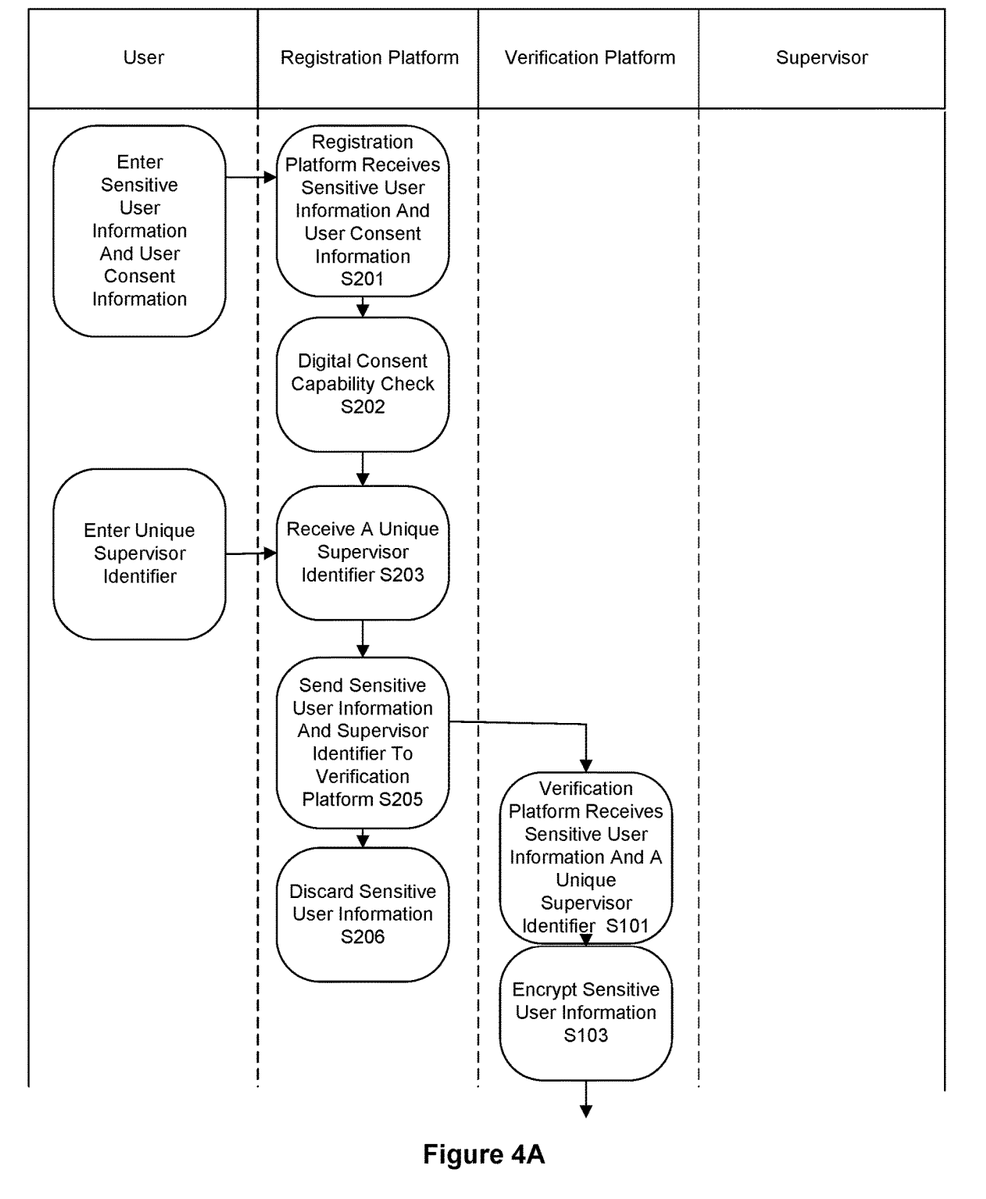
FIGS. 4A and 4B show a process flow of a registration and verification method performed by a system.
Figure 4B:
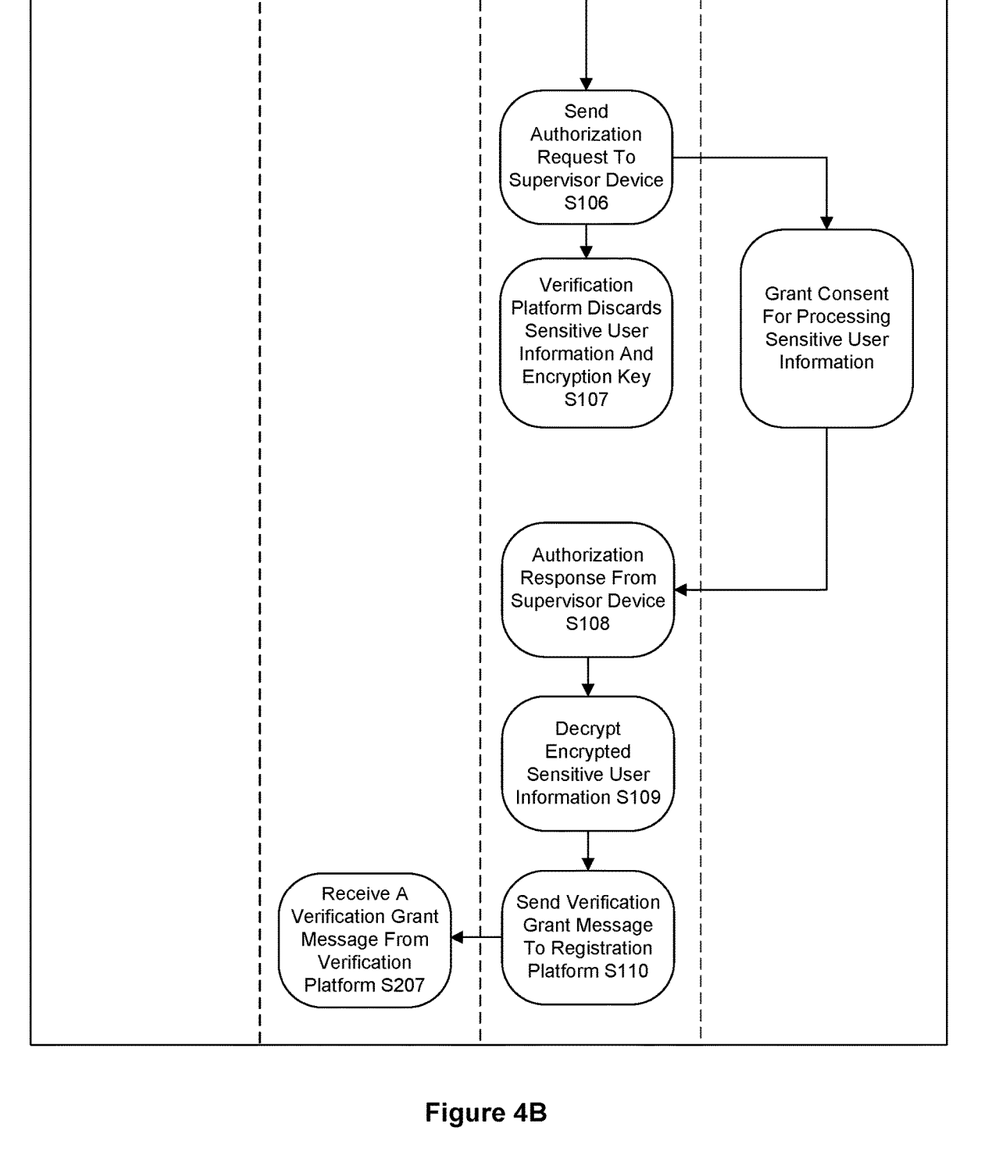

The verification method and registration method are described in FIGS. 2 and 3 respectively while FIGS. 4A and 4B provides an example implementation where the verification method and registration method are combined. FIG. 1 shows a system for performing a registration method and verification method, demonstrating the interactions (the steps described in FIGS. 2, 3, 4A and 4B) between the different components of the system.

In the following examples, digital consent refers to the legal requirement for consent for the processing of the personal data of those incapable of providing digital consent, such as a child. Consent is typically to be provided by the holder of parental responsibility over the child. However, digital consent is not limited to this example and may refer to any scenario where authorisation is required for collection and/or use of information or data in any way.

The data concerned may be personally identifiable information (PII), this is any data that can be used to identify a specific, living individual and has a very broad scope. For example, PII may be an email address, phone number, IP address, digital image, biometric or behavioural data. Different jurisdictions may class PII in different ways so it is important to be aware which apply and, if uncertain, presume the information is PII. Again, the methods described herein may be applicable to any situation in which authorisation may be provided for the storage of data, noting the particular applicability to the authorisation to store personally identifiable information, such authorisation being potentially provided by a third-party.

In these examples, a user incapable of providing digital consent is a child below the age of thirteen. However, the method is not limited to being performed in relation to children below a threshold age and the user may be any person who requires another party (herein referred to as a supervisor) to provide authorisation for collection and/or use of their personal data. For example, the verification method may also be used when an online service provider is seeking permission from a third party to store user-generated content.

FIG. 1 shows an example of a system comprising a user device 10, supervisor device 12, registration platform 14, verification platform 16, registration database 18 and a verification database 20.

The user device 10 is a device through which a user interacts with an online service or website, for example using a native app and corresponding web service or API or a web app. In the context of the invention, this interaction includes providing sensitive user information to the online service.

The supervisor device 12 is a device associated with a unique supervisor identifier. In one example, if the unique supervisor identifier is an email address associated with the supervisor, a supervisor device 12 may be a device on which the supervisor may access their email messages stored centrally. In another example, if the unique supervisor identifier is a username, for an application, associated with the supervisor, then a supervisor device 12 may be a device on which the supervisor may access their account for the application. In a further example, the unique supervisor identifier is a phone number or MSISDN associated with a mobile phone of the supervisor. In this further example, messages are not stored centrally but are delivered directly to the device associated with the MSISDN using, for example, SMS or an IP-based messaging service. Messages and/or information may also be uploaded to secure server for subsequent retrieval by the supervisor device using a unique identity.

Though FIG. 1 shows the registration platform 14 and the verification platform 16 as separate entities this is not required by the invention. Other embodiments may include the registration platform 14 and the verification platform 16 combined and integrated into a single platform.

An example scenario employing an embodiment of the user registration method and the user verification method of the present invention will be described in the context of a child attempting to create an account for an online game using their email address. More detailed explanations of the steps, and alternative steps, may be found below in the description of FIGS. 2, 3, 4A and 4B.

First, the child (using their user device 10) enters their email address and age (e.g. date of birth) into an account creation service (the registration platform 14) used for the online game (step S201) provided by an online service provider.

The registration platform 14 determines (step S202), by comparing the age of the child to the age of digital consent in the relevant country, that they are incapable of providing digital consent and so parental consent is required in order to process the child's email address (which is necessary for the game).

After prompting, the child then provides the registration platform 14 with their legal guardian's email address or the individual with parental responsibility (step S203). The registration platform 14 goes on to send both the child's email address and their legal guardian's email address to a verification platform 16 in order to verify whether the legal guardian has given consent for the processing of the child's email address (step S205). Following this step, the registration platform 14 discards the child's email address (step S206). As the registration platform 14 no longer possesses PI 1 of the child then the online service provider is not able to identify that child and thus are not breaching data protection regulations.

The verification platform 16 receives the email addresses of the child and the legal guardian sent by the registration platform 14 (step S101). Following this, in step S103, the verification platform 16 encrypts the child's email address using an encryption key to generate an encrypted version of the child's email address (referred to as the encrypted email address). The encryption key was generated before step S103 was performed (step S102) and a symmetric-key encryption scheme is used to encrypt the child's email address.

The encrypted email address will be unreadable and unrecognisable compared to the child's email address. Decryption is required (using the correct key for decryption) in order to make sense of the encrypted email address and retrieve the child's email address.

The encryption key is encoded into an authorisation request message (step S105) which is subsequently sent to the legal guardian (through a device of the legal guardian 12) using their email address (step S106). This message requests the legal guardian to give authorisation for their child's email address to be used by the game (and the necessary processing by the verification platform 16).

After the authorisation request message has been sent, the verification platform 16 discards the child's email address and the encryption key that was used to encrypt it. Now the verification platform 16 does not have access to the child's email address directly or indirectly through the encrypted email address (as the encryption key has been discarded) and so it complies with the data protection regulations.

The legal guardian views the authorisation request message on their device 12 and approves the request for authorisation, sending back an authorisation response message to the verification platform 16 (step S108). This response message includes the key required to decrypt the encrypted email address, which, in this example, is the same as the key used for encryption.

Once the verification platform 16 has received the response message granting authorisation, it can decrypt the encrypted email address using the received encryption key (step S109) to access the child's email address (with authorisation to do so). Now that the registration platform 14 (linked to the game the child is attempting to play) has permission to use the child's email address, the verification platform 16 sends a verification grant message (which includes the child's email address and a notice of the permissions given) to the registration platform 14 (step S110).

As permission for use of the child's email address has been granted, the child is able to complete the account creation process for the online game using their email address and the service provider of the online game is complying with the relevant data protection regulations.

In an alternative scenario, the child does not enter their own email address during account creation but instead uses their legal guardian's email address, along with another piece of PII, such as a username. In the scenario, it is this piece of PII which the registration platform sends to the verification platform and subsequently discards.

In another alternative scenario, a child has created an image (user-generated content), part of which contains a representation of the child, using a graphics editor. The child is attempting to upload it to a storage server, owned by the provider of the graphics editor, so that they can access and edit the image remotely. Similarly to the previous scenarios, if the image is stored by the service provider of the graphics editor without parental consent, they may not be complying with data protection regulations (as the representation of the child could be sensitive user information or contain PII— that platform does not know).

FIG. 2 shows a process flow outlining a user verification method performed by a verification platform 16 for a user incapable of providing digital consent. The user verification method may be used to gain authorisation from a third party for use of the PII of a user for which the third party holds a position of responsibility. First, in step S101, the verification platform 16 receives sensitive user information A and a unique supervisor identifier S.

The sensitive user information A is information associated with the user. For example, the sensitive user information A may be personal data of the child such as an email address, a name, or a pseudonym used by the child.

Similarly, the unique supervisor identifier S is information associated with a supervisor of the user and may be almost any form of unique identifier that allows the registration platform to contact the supervisor. For example, the unique supervisor identifier S may be an email address associated with the supervisor, an online service username, or an MSISDN.

Optionally, before encrypting the sensitive user information A (step S103 below), the verification platform 16 generates an encryption key K (step S102).

The generated encryption key K will be used later in the method to encrypt the sensitive user information A and/or decrypt an encrypted user identifier. The nature of the encryption key generated will depend on the type of encryption scheme implemented in the verification method. Similarly, the decryption key will depend on the encryption scheme and the associated encryption key used, that is, the decryption key may be the same as the encryption key or may be different.

It is preferred that the encryption key is unique as this increases the security of the encryption scheme and therefore the verification. Pseudo-randomly generating the encryption key is likely to produce a unique key although this is not guaranteed. However, as the verification platform 16 does not store any record of the encryption key, it will be unable to tell whether the key is a duplicate and so it can be assumed that the encryption key is unique.

Next, in step S103, the sensitive user information A is encrypted using an encryption scheme with an associated encryption key K in order to generate encrypted user information A'.

Encryption is the process of encoding information in such a way that only authorised parties can access the information (after decrypting the encrypted version of the information). In the present invention, the sensitive user information A is encrypted using an encryption key K to generate an encrypted user information A'. The encrypted user information A' is ciphertext that is incomprehensible without the proper encryption key for decrypting it. This means the encryption key is required in order to decrypt the encrypted user information A' and access the sensitive user information A.

The method of the present invention is not limited to a specific type of encryption and may employ any encryption scheme suitable for producing the encrypted user information A' that may only be decrypted using at least one encryption key. For example, the encryption scheme may be a symmetric-key scheme or an asymmetric-key scheme.

In symmetric-key encryption schemes the key used to encrypt plaintext into ciphertext is identical to the key used to decrypt that ciphertext back into plaintext. In the context of the present invention, this means that the verification platform must discard the encryption key used to encrypt the sensitive user information A. That is, the same encryption key used to encrypt the sensitive user information is the same key necessary to decrypt the information.

The Advanced Encryption Standard (AES) is a well-known symmetric-key algorithm with proven security that is based on a "substitution-permutation network". More specifically, the algorithm transforms a 128-bit plaintext block into 16 bytes that are arranged (substituted) into a 4×4 matrix in order to undergo several rounds of shifting, mixing, and combining with a round key (permutation) before outputting the resulting ciphertext. The decryption process performs the same steps using the same key for the same number of rounds, but the steps are applied in reverse order.

An asymmetric-key scheme (also known as a public-key scheme) will use different keys to encrypt and decrypt information. A public key (which may be shared widely) is used to encrypt information and a corresponding private key (known only to the owner) may be used to decrypt the information. Attempting to decrypt an encrypted message using the public key will not decrypt the message and return the original information. In the context of the present invention, this means that the verification platform must discard the private key but may keep the public key, as it cannot be used to decrypt the encrypted user information A'. Rivest-Shamir-Adleman (RSA) and elliptic-curve cryptography (ECC) are both common asymmetric cryptographic techniques. RSA exploits the difficulty of factoring the product of two large prime numbers while ECC algorithms take advantage of the complexity of finding the discrete logarithm of a random elliptic curve element (the private key) compared to a publically known base point (the public key). The private key is the key necessary to decrypt the information and is passed to the supervisor.

Both symmetric and asymmetric schemes are suitable for use in the present invention, provided that the chosen scheme employs a non-trivial encryption algorithm which renders the sensitive user information A unavailable without the correct decryption key. In each example, a key necessary for decrypting the information is passed to the supervisor and is not stored by the platform.

After encrypting the sensitive user information A (step S103 above), the verification platform 16 creates and stores an authorisation request record R in a verification database 20 (step S104).

The authorisation request record R comprises the unique supervisor identifier S and the encrypted user information A'. Storing the record R in a database provides an association between the unique supervisor identifier S and the encrypted user information A' that the verification platform 16 can retrieve if necessary at a later time.

Before sending an authorisation request message to a supervisor device 12 (step S106 below), the verification platform 16 may encode the encryption key K into an authorisation request message (step S105).

After encrypting the sensitive user information A (step S103 above), the verification platform 16 sends an authorisation request message to a supervisor device 12 (step S106). The authorisation request message comprises the encryption key K and a request for authorisation in response.

The format of the authorisation request message depends on the unique supervisor identifier S. For example, if the unique supervisor identifier S is an email address then the authorisation request message may be an email or an API request to an application used by the supervisor and associated with the email address. In an alternative example, if the unique supervisor identifier S is a phone number or MSISDN then the authorisation request message may be an SMS, MMS, or IP-based message.

The request for authorisation in response asks the supervisor to grant or refuse authorisation for processing of the personal data, including the sensitive user information A, of the user. This request may be implicit in the authorisation request message or may be explicitly included in the message or added by a separate application. The request for authorisation in response may be used to inform the supervisor of the circumstances which have led to the supervisor receiving the authorisation request message. For example, informing the supervisor that the user, who they are responsible for, is attempting to register a profile on an online service or website.

The authorisation request message may request the minimum level of authorisation required for a registration process to be completed or, alternatively, it may request also additional levels of authorisation. For example, this may be permission to use the sensitive user information A in a service that the online service provider does not currently perform.

Optionally, the authorisation request message may comprise the sensitive user information A, the encrypted user information A', or a link to view or retrieve A or A'. This allows the supervisor to check the sensitive user information and be fully aware of what they are being requested to authorise.

The authorisation request message may comprise the encryption key in a variety of different forms. Preferably, the authorisation request message comprises a magic link to enable the supervisor to provide authorisation and return the encryption key with low user friction. A magic link is an authenticated URL that allows passwordless authentication of the supervisor (device) when the link is activated. Alternatively, the authorisation request message uses different means to authenticate the supervisor; this may be, for example, a login form requiring username and password, or a code to be entered on a permissions service used by the supervisor.

The authorisation request message may provide the supervisor with a binary choice of whether to grant authorisation for the requested use of the sensitive user information A. Alternatively, the authorisation request message may include several permissions that can be selectively granted or withheld according to the supervisor (i.e. the supervisor can provide bespoke consent to decide how and by whom the sensitive user information A may be used).

In an exemplary use of a magic link, the URL may appear as "verification.com/access?token=abcd1234" and the verification platform will have an API endpoint "/access" to handle the link when it is clicked. The link is unique with the token in the URL corresponding to the unique supervisor identifier S so that, when the link is clicked, the verification platform is able to retrieve information about the supervisor to whom the token belongs. Optionally, the token is encrypted before being encoded into the URL; if this is the case then the verification platform must decrypt the token before retrieving information about the supervisor. Optionally, the encryption key is also encoded into the URL as part of the token; if this is the case then the encryption key is itself encrypted or hashed before its inclusion into the magic link for increased security. Alternatively, the magic link does not comprise the encryption key and is used to authenticate the supervisor before the key is provided by different means, e.g. as a cookie attached to the authorisation response message or retrieval from a secure web resource.

If a symmetric encryption scheme was used to encrypt the sensitive user information A, then the encryption key K included in the authorisation request message is identical to the encryption key used to encrypt the sensitive user information A in step S103. If an asymmetric encryption scheme was used to encrypt the sensitive user information A, then the encryption key included in the authorisation request message is different to the encryption key used to encrypt the sensitive user information A in step S103.

After sending an authorisation request message to a supervisor device 12 (step S106 above), the verification platform 16 discards the sensitive user information A and the encryption key (step S107).

As the verification platform 16 has discarded the encryption key it has no means of decrypting the encrypted user information A'. Though the verification platform 16 may still be storing the encrypted user information A' without authorisation from the supervisor this is not prohibited by the relevant regulations, such as COPPA and GDPR. This is because the encrypted user information A' does not count as the personal data of the user if the sensitive user information A cannot be retrieved using the encrypted user information A'.

Discarding both the sensitive user information A and the encryption key while having sent the authorisation request message, comprising the encryption key, to the supervisor results in the verification platform 16 being unable to access or possess the sensitive user information A unless the supervisor returns the encryption key.

If a symmetric encryption scheme was used in step S103, then the encryption key discarded is the encryption key used to encrypt the sensitive user information A. However, if an asymmetric encryption scheme was used in step S103, then the (private) encryption key must be discarded and the (public) encryption key may be stored or discarded for data minimisation.

After discarding the sensitive user information A and the encryption key (step S107 above), the user verification method may further include that the verification platform 16 receives an authorisation response message from the supervisor device 12 (step S108).

The authorisation response message comprises a received encryption key. If a symmetric encryption scheme was used to encrypt the sensitive user information A, then the received encryption key is identical to the encryption key used to encrypt the sensitive user information A in step S103 and included in the authorisation request message in step S106. If an asymmetric encryption scheme was used to encrypt the sensitive user information A, then the received encryption key is the private key and is not identical to the encryption key used to encrypt the sensitive user information A but is identical to the encryption key included in the authorisation request message in step S106. Optionally, the authorisation response message comprises a notice of consent that describes the level of consent that has been given by the supervisor for use of the sensitive user information A.

After receiving the authorisation response message (step S108 above), the verification platform 16 decrypts the encrypted user information A' using the received encryption key (step S109).

If a symmetric encryption scheme has been used, as the received encryption key is identical to the encryption key used to encrypt the sensitive user information A, the verification platform 16 can decrypt the encrypted user information A' in order to access the sensitive user information A. If an asymmetric encryption scheme has been used, the received encryption key is the correct private key required to decrypt the encrypted user information A' and so the sensitive user information A may be accessed. Since authorisation has been granted by the supervisor, the requested storing and/or using the sensitive user information A is not prohibited by the relevant regulations.

If an authorisation request record R was created in step S104, this step includes using the unique supervisor identifier S to retrieving the authorisation request record R from the verification database 20 so that the encrypted user information A' can be accessed for decryption.

Optionally, after decrypting the encrypted user information A' (step S109 above), the verification platform 16 sends a verification grant message to a registration platform 14 (step S110).

The verification grant message comprises the sensitive user information A and, optionally, the unique supervisor identifier S and/or the notice of consent.

In a scenario where the verification platform 16 is performing the user verification method on behalf of a verification request from a registration platform 14, sending the verification grant message to the registration platform 14 provides the registration platform 14 with the sensitive user information A and informs the registration platform 14 that authorisation has been granted for the requested use of the sensitive user information A. Receiving the verification grant message comprising the unique supervisor identifier S allows, for example, the registration platform 12 to associate the grant of authorisation with the unique supervisor identifier S so that subsequent verification requests may be controlled, prohibited or accelerated. If the registration platform 12 has stored a record of the unique supervisor identifier S then the record may be updated to associate the grant of authorisation with the unique supervisor identifier S.

Alternatively, after discarding the sensitive user information A and the encryption key (step S107 above), the user verification method may further include that the verification platform 16 receives a refusal response message from the supervisor device 12 (step S111).

The refusal response message indicates to the verification platform 16 that the supervisor has refused to grant authorisation for the requested processing of the sensitive user information A. Optionally, the refusal response message may comprise a notice of refusal that describes why authorisation was refused by the supervisor and/or a request for the encrypted user information A' to be discarded by the verification platform 16.

Optionally, after receiving the refusal response message from the supervisor device 12 (step S111 above), the verification platform 16 discards the encrypted user information A' (step S112).

Although continuing to store the encrypted user information A', without any means of decrypting it, does comply with the relevant regulations, the encrypted user information A' may be discarded for data minimisation. Furthermore, the supervisor and/or the user with whom the encrypted user information A' is associated may prefer that the encrypted user information A' is not stored and cannot be accessed.

If an authorisation request record R was created in step S104, this step includes retrieving the authorisation request record R from the verification database 20 so that the encrypted user information A' can be located and subsequently discarded.

Optionally, after receiving the refusal response message from the supervisor device 12 (step S111 above), the verification platform 16 sends a verification refusal message to a registration platform 14 (step S113).

The verification refusal message may comprise the unique supervisor identifier S and the refusal response message.

In a scenario where the verification platform 16 is performing the user verification method on behalf of a verification request from a registration platform 12, sending the verification refusal message to the registration platform 12 informs the registration platform 12 that authorisation for the requested use of the sensitive user information A has been refused. Receiving the verification refusal message comprising the unique supervisor identifier S allows, for example, the registration platform 12 to associate the refusal of authorisation with the unique supervisor identifier S so that subsequent verification requests may be controlled or prohibited. If the registration platform 12 has stored a record of the unique supervisor identifier S then the record may be updated to associate the refusal of authorisation with the unique supervisor identifier S.

Alternatively, after discarding the sensitive user information A and the encryption key (step S107 above), the user verification method may further include waiting for a predetermined period of time to expire (step S114).

The predetermined period of time may be any length of time, for example, one day, two days, one week, or one month. Furthermore, the predetermined period of time is not fixed. In other words, a predetermined period of time used in a first verification method may be different to a predetermined period of time used in a second verification method.

Optionally, after the predetermined period of time has expired, the supervisor is unable to send an authorisation response message. In this scenario the verification method must be repeated in order for authorisation to be granted, this may require the user to initiate a registration process again.

After waiting for the predetermined period of time to expire (step S114 above), the verification platform 16 discards the encrypted user information A' (step S115).

Although continuing to store the encrypted user information A', without any means of decrypting it, does comply with the relevant regulations, the encrypted user information A' may be discarded for data minimisation.

If an authorisation request record R was created in step S104, this step includes using the unique supervisor identifier S to retrieve the authorisation request record R from the verification database 20 so that the encrypted user information A' can be accessed for discarding.

Optionally, after waiting for the predetermined period of time to expire (step S114), the verification platform 16 sends a verification expiry message to a registration platform 14 (step S116). The verification expiry message may comprise the unique supervisor identifier S.

In a scenario where the verification platform 16 is performing the user verification method on behalf of a verification request from a registration platform 14, sending the verification expiry message to the registration platform 14 informs the registration platform 14 that authorisation for the requested use of the sensitive user information A has been not been granted within the predetermined period of time. Receiving the verification expiry message comprising the unique supervisor identifier S allows, for example, the registration platform 12 to associate the authorisation request expiry with the unique supervisor identifier S so that subsequent verification requests may be controlled or prohibited. If the registration platform 12 has stored a record of the unique supervisor identifier S then the record may be updated to associate the authorisation request expiry with the unique supervisor identifier S.

Performing the verification method described above and shown in FIG. 2 allows an online service provider to seek permission to store and use PII covered by data protection regulations without first storing the PII and breaching those regulations. Encrypting the sensitive user information A and discarding the verification platform's copy of the key necessary for decryption ensures that the supervisor is the sole party capable of providing access to the sensitive user information A.

FIG. 3 shows a process flow outlining a user registration method performed by a registration platform 14 for a user incapable of providing digital consent. The user registration method may be used by an online service provider to ensure they do not illegally use PII of users to whom data protection regulations are applicable. The user registration method may be, for example, a user registration method for a website or online service such as a video game.

First, in step S201, the registration platform 14 receives sensitive user information A and user consent information.

The sensitive user information A of the user registration method may be described in the same manner as the sensitive user information A detailed above in the user verification method.

The user consent information is associated with the user and enables the registration platform to determine whether the user is capable of providing digital consent. For example, the user consent information may comprise the age of the user. In another example, the user consent information may comprise a psychiatric disorder held by the user.

The sensitive user information A and the user consent information may be received directly from a user device 10 or, alternatively may be received from a person other than the user such as a service provider.

After receiving the sensitive user information A and the user consent information (step S201 above), the registration platform 14 determines, in step S202, whether the user is capable of providing digital consent.

For example, if the user consent information comprises the age of the user, the registration platform 14 may determine whether the age of the user is below a digital consent age threshold in the relevant jurisdiction.

If the user is not capable of providing digital consent, the registration platform receives, step S203, a unique supervisor identifier S.

The unique supervisor identifier S of the user registration method may be described in the same manner as the unique supervisor identifier S detailed above in the user verification method.

The unique supervisor identifier S may be received directly from the user or, alternatively may be received from a person other than the user such as a service provider.

Optionally, after receiving the unique supervisor identifier S (step S203 above), the registration platform 14 creates and stores a registration request record in a registration database 18 (step S204).

The registration request record comprises the unique supervisor identifier S. Storing a record comprising the unique supervisor identifier S allows the registration platform 14 to save a registration state associated with the unique supervisor identifier S. This may prevent, for example, the supervisor receiving multiple requests for authorisation while a previous request for authorisation is still pending, and has not been addressed by the supervisor, or when authorisation has been refused.

After receiving the unique supervisor identifier S (step S203 above), the registration platform 14 sends, step S205, the sensitive user information A and the unique supervisor identifier S to a verification platform 16.

Sending the sensitive user information A and the unique supervisor identifier S to a verification platform 16 allows the verification platform 16 to verify whether a supervisor of the user has granted authorisation for the use of the sensitive user information A and, if authorisation has not previously been granted, request authorisation for the use of the sensitive user information A.

The verification platform 16 may be a separate entity to the registration platform 14. Alternatively, the verification platform 16 and registration platform 14 may both be integrated into a single system.

After sending the sensitive user information A and the unique supervisor identifier S to the verification platform 16 (step S205 above), the registration platform 14 discards, in step S206, the sensitive user information A.

After discarding the sensitive user information A, the registration platform 14 does not hold any personal data of the user incapable of providing digital consent and does not have any means for accessing such personal data. Therefore, the registration platform 14 and the operator of the registration platform 14 comply with the relevant regulations.

Optionally, after discarding the sensitive user information A (step S206 above), the registration platform 14 receives, step S207, a verification grant message from the verification platform 16.

The verification grant message comprises a received sensitive user information A and, optionally, a notice of consent.

The received sensitive user information A is identical to the sensitive user information A that was received in step S201 and discarded in step S206. Receiving the sensitive user information A from the verification platform 16 indicates to the registration platform 14 that authorisation has been granted for the requested use of the sensitive user information A.

The notice of consent of the user registration method may be described in the same manner as the notice of consent detailed above in the user verification method.

Optionally, after discarding the sensitive user information A (step S206 above), the registration platform 14 receives, step S208, a verification refusal message from the verification platform 16.

The verification refusal message indicates to the registration platform 14 that the supervisor has refused to grant authorisation for the requested processing of the sensitive user information A.

Optionally, the verification refusal message comprises a notice of refusal that describes why authorisation was refused by the supervisor.

Optionally, after discarding the sensitive user information A (step S206 above), the registration platform 14 receives, step S209, a verification expiry message from a verification platform 16.

The verification expiry message informs the registration platform 14 that authorisation for the requested use of the sensitive user information A has not been granted within a predetermined period of time.

It will be appreciated that elements of the verification method described in steps S101 to S116 may be performed in combination with elements of the registration method described in steps S201 to S209.

FIGS. 4A and 4B show a process flow of a registration and verification method performed by a system. The process flow shows an example of the interactions between the registration platform 14 and the verification platform 16, as well as those by the user and supervisor, where authorisation is granted by the supervisor.

FIGS. 4A and 4B show a process flow of a registration and verification method combining the registration method, described above and shown in FIG. 3, with the verification method, described above and shown in FIG. 2, in a scenario where authorisation for processing of the sensitive user information A is granted by the supervisor. FIGS. 4A and 4B also show the interactions between the registration platform 14 and the verification platform 16, as well as the interactions and decisions made by the user and the supervisor.

While the present invention has been described in the context of certain platforms, it will be understood that the principles described may be implemented through any arrangement of suitable computing devices or distributed computing devices. A platform may be thought of as a remote server operating over a network. The principles are not limited to any specific operating system or architecture and indeed are designed to be system or platform agnostic. The device described above as a user device or a supervisor device may be any sort of suitable device such as a personal computer, tablet computer or smartphone.

It is important to note that while the present invention has been described in the context of a fully functioning system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disc drive, RAM and CD-ROMs as well as transmission-type media such as digital and analogue communication links.

The invention claimed is:

1. A method performed by a verification platform for authorizing a user incapable of providing digital consent, the method comprising:
receiving sensitive user information and a unique supervisor identifier;
encrypting the sensitive user information using an encryption scheme with an associated encryption key to generate encrypted user information;
sending an authorization request message to a supervisor device associated with the unique supervisor identifier, wherein the authorization request message comprises the encryption key and a request for authorization in response;
discarding the sensitive user information and the encryption key, such that the verification platform cannot access the sensitive user information;
if the verification platform receives an authorization response message from the supervisor device comprising a received encryption key,
decrypting the encrypted user information using the received encryption key, such that the sensitive user information is accessible by the verification platform; and
sending a verification grant message to a registration platform, thereby authorizing the user.

2. The method of claim 1, wherein after discarding the sensitive user information and the encryption key, the method further comprises:
if the verification platform receives a refusal response message from the supervisor device,
discarding the encrypted user information.

3. The method of claim 2, wherein after discarding the sensitive user information and the encryption key, the method further comprises:
if a predetermined period of time expires without the verification device receiving a response message from the supervisor device,
discarding the encrypted user information.

4. The method of claim 1, wherein after discarding the sensitive user information and the encryption key, the method further comprises:
if a predetermined period of time expires without the verification device receiving a response message from the supervisor device,
discarding the encrypted user information.

5. The method of claim 1, wherein before encrypting the sensitive user information the, the method further comprises:
pseudo-randomly generating an encryption key.

6. The method of claim 1, wherein after the encrypting, the method further comprises:
creating an authorization request record, in a verification database, comprising the unique supervisor identifier and the encrypted user information;
storing the authorization request record in the verification database; and,
if the verification platform receives an authorization response message, retrieving the authorization request record from the verification database.

7. The method of claim 1, wherein before sending the authorization request message, the method further comprises:
encoding the encryption key into the authorization request message.

8. The method of claim 1, wherein the authorization request message further comprises an authenticated URL for granting permission to decrypt the sensitive user information and sending the authorization response message from the supervisor device to the verification platform.

9. The method of claim 8, wherein the authenticated URL comprises a token representing the encryption key and/or the sensitive user information.

10. A user registration method performed by a registration platform for registering a user incapable of providing digital consent, the method comprising:
  receiving sensitive user information and user consent information;
  identifying, using the user consent information, whether a user is capable of providing digital consent; and,
  if the user is not capable of providing digital consent, the method further comprises:
  receiving a unique supervisor identifier;
  sending the sensitive user information and the unique supervisor identifier to a verification platform; and
  subsequently discarding the sensitive user information;
  receiving a verification grant message from the verification platform, thereby registering the user; and
  receiving the sensitive user information from the verification platform following successful authorization at the verification platform, such that the sensitive user information is accessible by the registration platform.

11. The user registration method of claim 10, wherein the method further comprises:
  creating a registration request record, in a registration database, comprising the unique supervisor identifier; and
  storing the registration request record in the registration database.

12. The user registration method of claim 10, wherein the method further comprises: creating a registration request record, in a registration database, comprising the unique supervisor identifier; and storing the registration request record in the registration database.

13. A verification platform for performing a method for authorizing a user incapable of providing digital consent, the verification platform configured to:
  receive sensitive user information and a unique supervisor identifier;
  encrypt the sensitive user information using an encryption scheme with an associated encryption key to generate encrypted user information;
  send an authorization request message to a supervisor device associated with the unique supervisor identifier, wherein the authorization request message comprises the encryption key and a request for authorization in response;
  discard the sensitive user information and the encryption key, such that the verification platform cannot access the sensitive user information;
  if the verification platform receives an authorization response message from the supervisor device comprising a received encryption key,
  decrypt the encrypted user information using the received encryption key, such that the sensitive user information is accessible by the verification platform; and
  send a verification grant message to a registration platform, thereby authorizing the user.

14. A registration platform for performing a user registration method, the registration platform configured to:
  receive sensitive user information and user consent information;
  identify, using the user consent information, whether a user is capable of providing digital consent; and,
  if the user is not capable of providing digital consent, receive a unique supervisor identifier;
  send the sensitive user information and the unique supervisor identifier to a verification platform; and
  subsequently discard the sensitive user information, wherein the registration platform is configured to send the sensitive user information and the unique supervisor identifier to a verification platform, wherein the verification platform is configured to:
  receive sensitive user information and a unique supervisor identifier;
  encrypt the sensitive user information using an encryption scheme with an associated encryption key to generate encrypted user information;
  send an authorization request message to a supervisor device associated with the unique supervisor identifier, wherein the authorization request message comprises the encryption key and a request for authorization in response;
  discard the sensitive user information and the encryption key, such that the verification platform cannot access the sensitive user information; and,
  if the verification platform receives an authorization response message from the supervisor device comprising a received encryption key,
  decrypt the encrypted user information using the received encryption key, such that the sensitive user information is accessible by the verification platform; and
  send a verification grant message to a registration platform, thereby authorizing the user.

15. A system for performing a user registration and verification method, the system comprising:
  a verification platform configured to:
  receive sensitive user information and a unique supervisor identifier;
  encrypt the sensitive user information using an encryption scheme with an associated encryption key to generate encrypted user information;
  send an authorization request message to a supervisor device associated with the unique supervisor identifier, wherein the authorization request message comprises the encryption key and a request for authorization in response;
  discard the sensitive user information and the encryption key, such that the verification platform cannot access the sensitive user information; and,
  if the verification platform receives an authorization response message from the supervisor device comprising a received encryption key,
  decrypt the encrypted user information using the received encryption key, such that the sensitive user information is accessible by the verification platform; and,
  send a verification grant message to a registration platform, thereby verifying the user; and
  a registration platform configured to:
  receive sensitive user information and user consent information;
  identify, using the user consent information, whether a user is capable of providing digital consent; and,
  if the user is not capable of providing digital consent,
  receive a unique supervisor identifier;
  send the sensitive user information and the unique supervisor identifier to a verification platform; and
  subsequently discard the sensitive user information, wherein the registration platform is configured to send the sensitive user information and the unique supervisor identifier to a verification platform; and
  receive the verification grant message from the verification platform, thereby registering the user.

16. The system of claim 15, wherein the verification platform is configured to:
  receive sensitive user information and a unique supervisor identifier;

encrypt the sensitive user information using an encryption scheme with an associated encryption key to generate encrypted user information;

send an authorization request message to a supervisor device associated with the unique supervisor identifier, wherein the authorization request message comprises the encryption key and a request for authorization in response; and discard the sensitive user information and the encryption key, such that the verification platform cannot access the sensitive user information.

17. The system of claim 16, wherein the verification platform is configured to:

if the verification platform receives an authorization response message from the supervisor device comprising a received encryption key, decrypt the encrypted user information using the received encryption key, such that the sensitive user information is accessible by the verification platform.

18. A non-transitory computer readable medium comprising instructions which when executed by a processor, cause the processor to:

receive sensitive user information and a unique supervisor identifier;

encrypt the sensitive user information using an encryption scheme with an associated encryption key to generate encrypted user information;

send an authorization request message to a supervisor device associated with the unique supervisor identifier, wherein the authorization request message comprises the encryption key and a request for authorization in response;

discard the sensitive user information and the encryption key, such that a verification platform cannot access the sensitive user information;

if the verification platform receives an authorization response message from the supervisor device comprising a received encryption key, decrypt the encrypted user information using the received encryption key, such that the sensitive user information is accessible by the verification platform; and send a verification grant message to a registration platform, thereby authorizing the user.

19. The non-transitory computer readable medium of claim 18, further comprising instructions which when executed by the processor, cause the processor to:

receive the sensitive user information and user consent information;

identify, using the user consent information, whether a user is capable of providing digital consent; and, if the user is not capable of providing digital consent, the processor further:

receives the unique supervisor identifier;

sends the sensitive user information and the unique supervisor identifier to the verification platform; and subsequently discards the sensitive user information.

* * * * *